(12) United States Patent
Kim et al.

(10) Patent No.: US 10,204,452 B2
(45) Date of Patent: Feb. 12, 2019

(54) APPARATUS AND METHOD FOR PROVIDING AUGMENTED REALITY-BASED REALISTIC EXPERIENCE

(71) Applicant: ELECTRONICS AND TELECOMMUNICATIONS RESEARCH INSTITUTE, Daejeon (KR)

(72) Inventors: Ho-Won Kim, Seoul (KR); Kyu-Sung Cho, Daejeon (KR); Tae-Joon Kim, Daejeon (KR); Sung-Ryull Sohn, Daejeon (KR); Ki-Nam Kim, Seoul (KR); Chang-Joon Park, Daejeon (KR); Hye-Sun Park, Daejeon (KR); Jin-Sung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 183 days.

(21) Appl. No.: 15/077,166

(22) Filed: Mar. 22, 2016

(65) Prior Publication Data
US 2016/0284132 A1    Sep. 29, 2016

(30) Foreign Application Priority Data
Mar. 23, 2015    (KR) .................. 10-2015-0039966

(51) Int. Cl.
*G06K 9/00*        (2006.01)
*G06T 19/00*       (2011.01)
(Continued)

(52) U.S. Cl.
CPC ............ *G06T 19/006* (2013.01); *G06F 3/011* (2013.01); *G06F 3/147* (2013.01);
(Continued)

(58) Field of Classification Search
None
See application file for complete search history.

(56) References Cited

U.S. PATENT DOCUMENTS

2013/0222427 A1    8/2013    Heo et al.
2014/0002498 A1    1/2014    Lee et al.
(Continued)

FOREIGN PATENT DOCUMENTS

JP    1995-075120 A     3/1995
KR    10-2010-0137690 A  12/2010
(Continued)

*Primary Examiner* — Yingchun He
(74) *Attorney, Agent, or Firm* — LRK Patent Law Firm

(57) ABSTRACT

An apparatus and method for providing augmented reality-based realistic experience. The apparatus for providing augmented reality-based realistic experience includes a hardware unit and a software processing unit. The hardware unit includes a mirror configured to have a reflective characteristic and a transmissive characteristic, a display panel configured to present an image of an augmented reality entity, and a sensor configured to acquire information about a user. The software processing unit presents the augmented reality entity via the display panel based on the information about the user from the hardware unit after performing color compensation on the color of the augmented reality entity.

21 Claims, 18 Drawing Sheets

(51) Int. Cl.
*G06T 7/00* (2017.01)
*G06T 7/40* (2017.01)
*G06F 3/01* (2006.01)
*G09G 5/02* (2006.01)
*G06F 3/147* (2006.01)
*G09B 19/00* (2006.01)

(52) U.S. Cl.
CPC ..... *G06K 9/00369* (2013.01); *G06K 9/00597* (2013.01); *G09G 5/02* (2013.01); *G09B 19/003* (2013.01); *G09G 2340/0492* (2013.01); *G09G 2354/00* (2013.01)

(56) References Cited

U.S. PATENT DOCUMENTS

| | | |
|---|---|---|
| 2014/0111507 A1 | 4/2014 | Kim et al. |
| 2014/0168217 A1 | 6/2014 | Kim et al. |
| 2014/0226000 A1* | 8/2014 | Vilcovsky ............... G06F 3/017 348/77 |
| 2015/0099252 A1* | 4/2015 | Anderson ............ G09B 19/003 434/257 |

FOREIGN PATENT DOCUMENTS

| | | | |
|---|---|---|---|
| KR | 10-2013-0128202 A | 11/2013 | |
| KR | 10-2014-0042119 A1 | 4/2014 | |
| KR | 10-2014-0052792 A | 5/2014 | |
| KR | 10-2014-0077820 A | 6/2014 | |
| WO | WO 2013180651 A1 * | 12/2013 | ............. G09F 13/12 |

\* cited by examiner

APPARATUS AND METHOD FOR PROVIDING AUGMENTED REALITY-BASED REALISTIC EXPERIENCE

CROSS-REFERENCE TO RELATED APPLICATION

This application claims the benefit of Korean Patent Application No. 10-2015-0039966, filed on Mar. 23, 2015, which is hereby incorporated by reference herein in its entirety.

BACKGROUND

1. Technical Field

The present disclosure relates generally to an apparatus and method for providing augmented reality-based realistic, experience, and more particularly to an apparatus and method that accurately provide an augmented reality result, intended by a content creator, to a user who receives service when an augmented reality-based realistic experience content service is implemented using a large-sized screen, mirror-type display device.

2. Description of the Related Art

With the commercialization and popularization of RGBD sensors, such as Kinect, many realistic experience content services (see FIGS. 1 to 7), such as virtual dressing or virtual clothes fitting, directly targeted for users have appeared in connection with an augmented reality technique based on the recognition of known patterns, such as a book, a desk having a predetermined pattern, etc., which is used in existing e-learning, etc.

Such realistic experience content (1 of FIG. 1, and 2 of FIG. 2) provides augmented reality experience using a method of overlaying an object, having provided augmented reality intended by a realistic experience content creator, on a user image of a user moving in real time captured via various video image sensors. That is, a virtual mirror (3 of FIG. 3) is constructed using a video image sensor and a large-sized screen display panel, and an augmented reality object (4 of FIG. 4) is overlaid on a user region within an image of seeming to view a mirror, thereby providing the realistic experience of seeming to wear clothes.

An augmented reality technique using a virtual mirror (see FIGS. 1 and 2) is widely adopted due to the ease of implementation from the viewpoint of the configuration of a system. Although this technique provides the ease of implementation, most systems have delay time required for data processing within a system. Kinect has a delay time of about 100 msec. This delay time is inevitable when operations are required for a sensor and image processing in an augmented reality system. In order to overcome this, a method of preventing a user from becoming aware of the delay of an augmented reality result attributable to a system delay through the synchronization between the delay time of each sensor and image processing time may be used. Since the virtual mirror-based augmented reality enables the processing, many augmented reality-based realistic experience services use this method.

However, the virtual mirror-based method is disadvantageous in that image quality is inevitably degraded or a result of the virtual mirror is not viewed as realistic due to sensor characteristics because the virtual mirror-based method uses an image emitted from a video image sensor.

Recent approaches attempt mirror-based augmented reality realistic experience service using an actual mirror (see FIG. 5).

A mirror-based method using an actual mirror constructs a system in such a way as to combine a mirror 10 having two optical characteristics, as shown in FIG. 8, with a display panel 12, and provides service. In this case, the mirror 10 has a first optical characteristic adapted to reflect light 14 entering a mirror from the outside in a direction in which a user 5 views the light and thus exhibit an actual mirror effect, like an actual mirror, and a second optical characteristic adapted to pass light or an image 16 entering from the display panel 12 and thus enable the user 5 to view the light or image 16.

As an example, the combination of the mirror 10 and the display panel 12 is configured such that based on the viewpoint of a user, a mirror 10 is attached at a front location and a display panel 12 is placed at a rear location. When the display panel 12 does not emit an image, the combination operates as a mirror due to the first optical characteristic. When the display panel 12 emits an image, light 16 emitted by the display panel 12 based on the second optical characteristic is stronger than light 14 based on the first optical characteristic, and an image from the panel preferentially reaches the eyes of the user. When a currently commercialized mirror is taken as an example, about 80% of input light is transferred to the user with respect to the first optical characteristic, and about 30 to 40% of input light is transferred to the user with respect to the second optical characteristic.

That is, in the mirror-based method, due to the configuration of a system, a user recognizes 120~130% light, into which two rays of light are added, with his or her eyes. Although the proportion of light transferred to a user can be relatively increased by increasing the candela of a display panel based on the second optical characteristic, a problem regarding the occurrence of the combination of colors attributable to the first optical characteristic and the second optical characteristic cannot be overcome. Accordingly, as shown in FIG. 7, a limitation arises in that the sensation of color of an augmented reality entity that a realistic experience content creator desires to transfer cannot be accurately transferred to a user. As an example, referring to FIG. 7, it can be seen that the color of virtual clothes, i.e., an augmented reality entity, is not accurately transferred due to the color of clothes worn by a user, unlike in the example of FIG. 4 using the virtual mirror-based method.

This mirror-based method is also different from the virtual mirror-based method in that an augmented reality entity presented to a display panel is intended only for a single user, as shown in the examples of FIGS. 5 to 7. In the case of the virtual mirror-based method, a final image obtained by combining an image received from a video image sensor with an augmented reality entity is presented via a display panel, as shown in FIGS. 3 and 4, and thus users located at various front locations view the same resulting screen. That is, when a service in which a user virtually wears clothes is taken as an example, a peer can determine the fitness of the clothes while viewing the same result along with the user.

Referring to Korean Patent Application Publication No. 2013-0128202 entitled "Mirror Display-based Augmented Reality method and Apparatus applied to the Same," in a mirror-based method, such as that of FIG. 9, due to the first characteristic of a mirror 10, an augmented reality entity is presented (i.e., transmits the mirror 10; see reference symbol 16) at a virtual camera viewpoint 18 equivalent to the location of the eyes of a user 5 who is experiencing actual realistic experience content using a computer graphics rendering technology or an image processing technology via a display panel 12, thereby providing his or her own appearance 14 reflected on the mirror 10 and virtual clothes fitting experience (see FIG. 7).

In this case, a peer 7 views light 20 in a different direction, other than the appearance of the user 5 reflected on the mirror 10 based on the first optical characteristic of the mirror 10. Furthermore, an image from the display panel 12 is directly presented (see reference symbol 16) due to the second optical characteristic, and thus the user 5 and the augmented reality entity 16 are presented at different locations on a screen, thereby exhibiting the limitation in which the virtual wearing appearance of the user 5 cannot be viewed, as shown in FIG. 5 or 6. In FIG. 9, reference symbol 22 denotes a virtual camera viewpoint equivalent to the location of the eyes of the peer 7.

Other preceding technologies include Korean Patent Application Publication No. 2014-0077820 entitled "Virtual Item Fitting Method using Human Body Model and Virtual Item Fitting Service Provision System" and Korean Patent Application Publication No. 2014-0052792 entitled "Apparatus and Method for restoring 3D Entire Body Shape using Depth Image and Color Image."

SUMMARY

At least some embodiments of the present invention are directed to the provision of an apparatus and method for providing augmented reality-based realistic experience, which accurately transfer the sensation of color of an augmented reality entity and also enable multiple users to simultaneously share realistic experience content in a system for providing realistic experience content service, such as a virtual clothing experience, via an augmented reality technique based on a mirror having a reflective characteristic and an external light-transmissive characteristic.

According to an aspect of the present invention, there is provided an apparatus for providing augmented reality-based realistic experience, including: a hardware unit including a mirror configured to have a reflective characteristic and a transmissive characteristic, a display panel configured to present an image of an augmented reality entity, and a sensor configured to acquire information about a user; and a software processing unit configured to present the augmented reality entity via the display panel based on the information about the user from the hardware unit after performing color compensation on the color of the augmented reality entity.

The software processing unit may include: a user information acquisition and processing unit configured to receive and process the information about the user from the sensor; and an augmented reality entity processing and visualization unit configured to process and visualize the augmented reality entity based on the information about the user from the user information acquisition and processing unit.

The user information acquisition and processing unit may include: a sensor image acquisition unit configured to receive a color image and depth image of the user and user joint information from the sensor; a user image region extraction unit configured to extract a user projected region within an image based on the color image, the depth image and the user joint information; a user presence determination unit configured to determine whether the user is present in the image from the user image region extraction unit; a user appearance information extraction unit configured to extract the appearance information of the user from the user projected region within the image if the user is present; a user eye location extraction unit configured to extract the location of the eyes of the user based on the appearance information of the user; and a mirror-projected user appearance information extraction unit configured to extract user information projected onto the mirror based on the appearance information of the user as the location of the eyes of the user is extracted.

The appearance information of the user extracted by the user appearance information extraction unit may include three-dimensional (3D) shape information indicative of the height and physical appearance shape characteristic of the user and surface color information indicative of the appearance surface color characteristic of the user.

The user eye location extraction unit may extract the location of the eyes of the user from the appearance information of the user from the user appearance information extraction unit via the analysis of anthropometrical body rate information and the color characteristic of the eyes of a face region.

The software processing unit may further include a user video image acquisition and processing unit configured to acquire and process a video image of the user via the sensor.

The sensor may include a video sensor; and the user video image acquisition and processing unit may include a sensor image acquisition unit configured to acquire the image of the user from the video sensor, a user image region extraction unit configured to projecting the 3D shape information of the user, acquired from the user information acquisition and processing unit, onto the video sensor and extract the image region of the user acquired by the video sensor, and a mirror-projected user appearance information extraction unit configured to extract the user information, projected onto the mirror, from the image region of the user, extracted by the user image region extraction unit of the user video image acquisition and processing unit, using mirror-projected user information and user eye location information from the user information acquisition and processing unit.

The augmented reality entity processing and visualization unit may include: an augmented reality entity input unit configured to receive the augmented reality entity, to be presented, from the hardware unit; an augmented reality entity mirror projection unit configured to, as the augmented reality entity is input, calculate a location on the display panel corresponding to an intersection on the mirror using the first and second optical characteristics of the mirror and calculate a color value of light attributable to the second optical characteristic of the mirror at the calculated location on the display panel; a color compensation processing unit configured to compensate for the color value of the light attributable to the second optical characteristic of the mirror from the augmented reality entity mirror projection unit using the color value of the mirror-projected user information from the user information acquisition and processing unit or the user video image acquisition and processing unit; and a display panel presentation unit configured to present the augmented reality entity based on the color value compensated for by the color compensation processing unit.

The augmented reality entity mirror projection unit, when the augmented reality entity composed of 3D data is input, may calculate a location on the display panel corresponding to an intersection on the mirror at which a 3D rectilinear line, connecting a point of a body part of the user and a virtual camera viewpoint equivalent to the location of the eyes of the user, and the mirror intersect each other.

The color compensation processing unit may compensate for the color value, calculated by the augmented reality entity mirror projection unit, using the reflectivity of the reflective characteristic of the mirror, the transmittance of the transmissive characteristic of the mirror, a color attributable to the reflective characteristic of the mirror, and a color attributable to the transmissive characteristic of the mirror.

The apparatus may further include a viewer viewpoint-based software processing unit configured to interpret the information from the software processing unit on a viewer basis, calculate the region of the user projected onto the mirror and projected surface color information at the location of a viewer, and perform the processing and visualization of the augmented reality entity using the calculated region and information.

The viewer viewpoint-based software processing unit may include: a viewer information acquisition and processing unit configured to output viewer viewpoint-based mirror-projected user information and information about the location of the eyes of the viewer based on information about the viewer from the sensor and the 3D shape information and surface color information of the user from the software processing unit; and an augmented reality entity processing and visualization unit configured to process and visualize the augmented reality entity for the corresponding viewer based on the information from the viewer information acquisition and processing unit and the 3D shape information and surface color information of the user from the software processing unit.

The viewer information acquisition and processing unit may include a viewer viewpoint-based mirror-projected user appearance information extraction unit configured to calculate the location of the point on the mirror corresponding to a point on the body part of the user using the 3D shape information and surface color information of the user from the software processing unit, and to extract viewer viewpoint-based mirror-projected user information at the location of the point of the mirror.

According to another aspect of the present invention, there is provided an apparatus for providing augmented reality-based realistic experience, including: a hardware unit including a display panel configured to present an image of an augmented reality entity, and a sensor configured to acquire information about a user; and a software processing unit configured to present the augmented reality entity via the display panel based on the information about the user from the hardware unit after performing color compensation on the color of the augmented reality entity.

The color compensation may use the transmittance of light entering from a location behind the display panel and a color entering from a location behind the display panel.

The apparatus may further include a viewer viewpoint-based software processing unit configured to interpret the information from the software processing unit on a viewer basis, to calculate the region of the user projected onto the mirror and projected surface color information at the location of a viewer, and to perform the processing and visualization of the augmented reality entity using the calculated region and information.

According to another aspect of the present invention, there is provided a method of providing augmented reality-based realistic experience, including: receiving, by a software processing unit, information about a user from a sensor of a hardware unit including a mirror, a display panel and the sensor; and presenting, by the software processing unit, an augmented reality entity via the display panel based on the information about the user after performing color compensation on a color of the augmented reality entity.

Presenting the augmented reality entity via the display panel may include: as the augmented reality entity is received from the hardware unit, calculating a location on the display panel corresponding to an intersection on the mirror using the first and second optical characteristics of the mirror; calculating the color value of light attributable to the second optical characteristic of the mirror at the calculated location on the display panel; compensating for the color value of the light attributable to the second optical characteristic of the mirror; and presenting the augmented reality entity based on the compensated color value.

The method may further include, by a viewer viewpoint-based software processing unit, interpreting the information from the software processing unit on a viewer basis, calculating the region of the user projected onto the mirror and projected surface color information at the location of a viewer, and performing the processing and visualization of the augmented reality entity using the calculated region and information.

Performing the processing and visualization of the augmented reality entity may include: outputting viewer viewpoint-based mirror-projected user information and information about the location of the eyes of the viewer based on information about the viewer from the sensor and the 3D shape information and the surface color information of the user from the software processing unit; and processing and visualizing the augmented reality entity for the corresponding viewer based on the viewer viewpoint-based mirror-projected user information, the information about the location of the eyes of the viewer, and the 3D shape information and surface color information of the user from the software processing unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
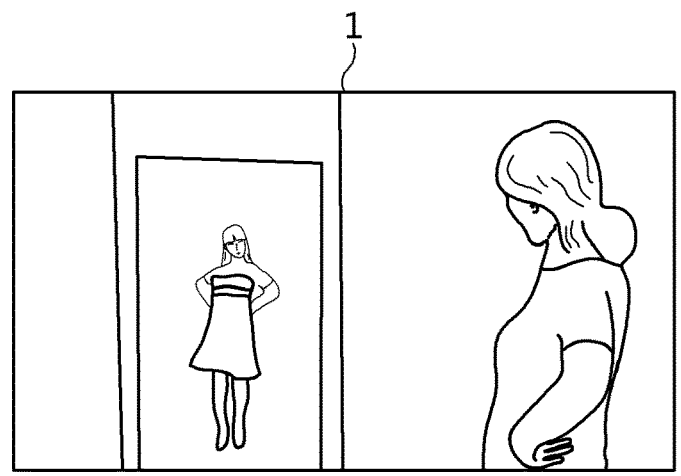
FIGS. 1 to 7 are drawings showing examples of conventional realistic experience content services.
Figure 2:
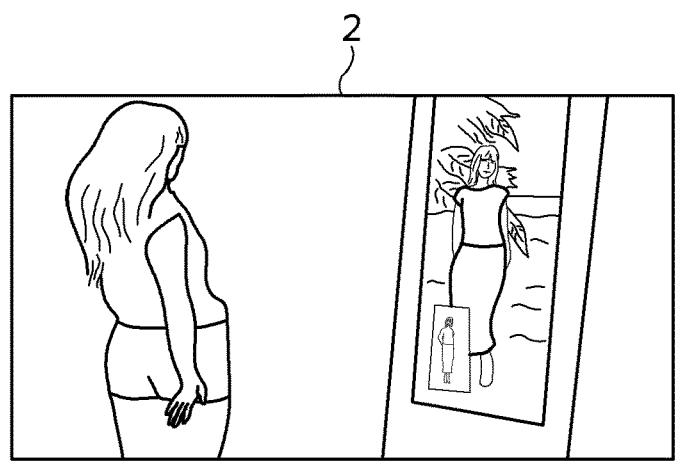
Figure 3:
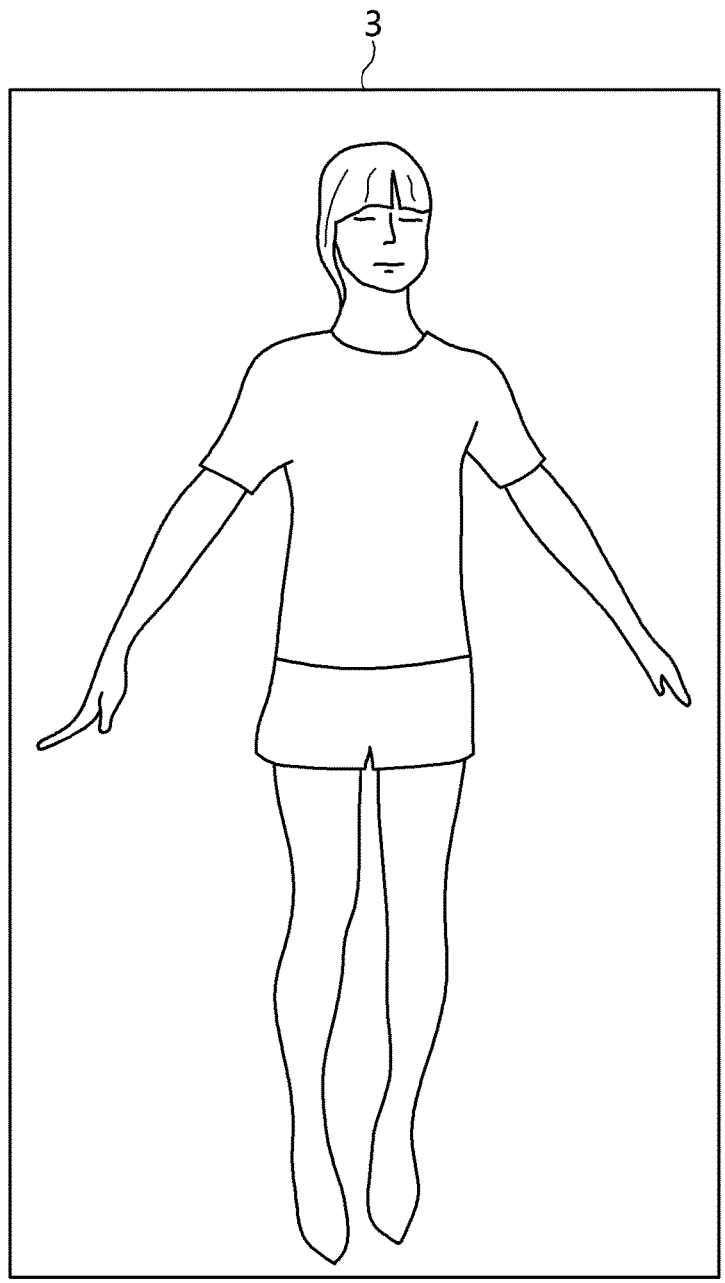

The present invention may be modified in various ways and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and are not used to limit the present invention. A singular form may include a plural form unless otherwise defined. The terms, including "comprise," "includes," "comprising," "including" and their derivatives, specify the presence of described shapes, numbers, steps, operations, elements, parts and/or groups thereof, and do not exclude the possibility of the presence or addition of one or more other shapes, numbers, steps, operations, elements, parts, and/or groups thereof.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having meanings that are consistent with their meanings in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

Figure 10:
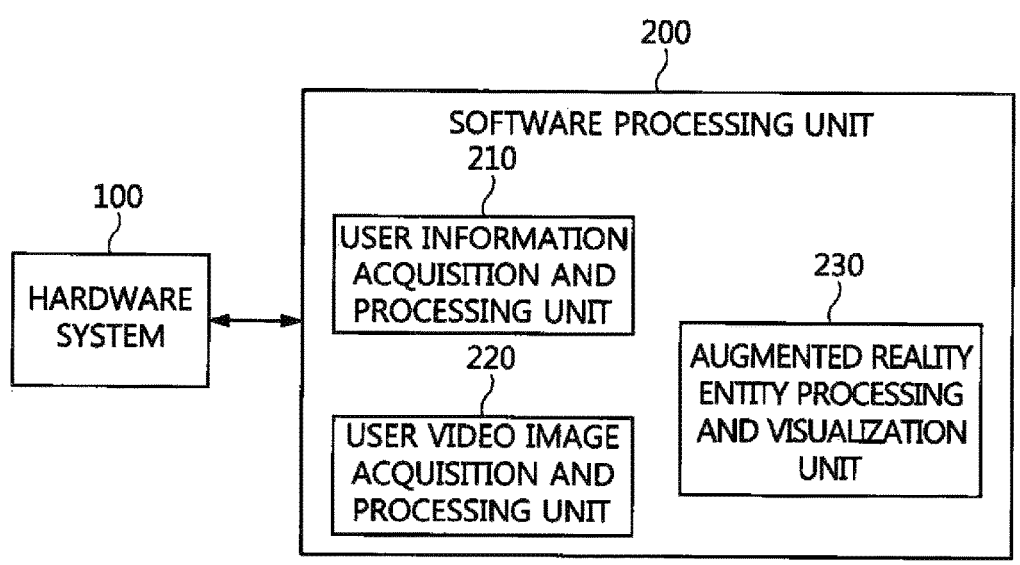
FIG. 10 is a diagram showing the configuration of an apparatus for providing augmented reality-based realistic experience according to an embodiment of the present invention.
Figure 11:
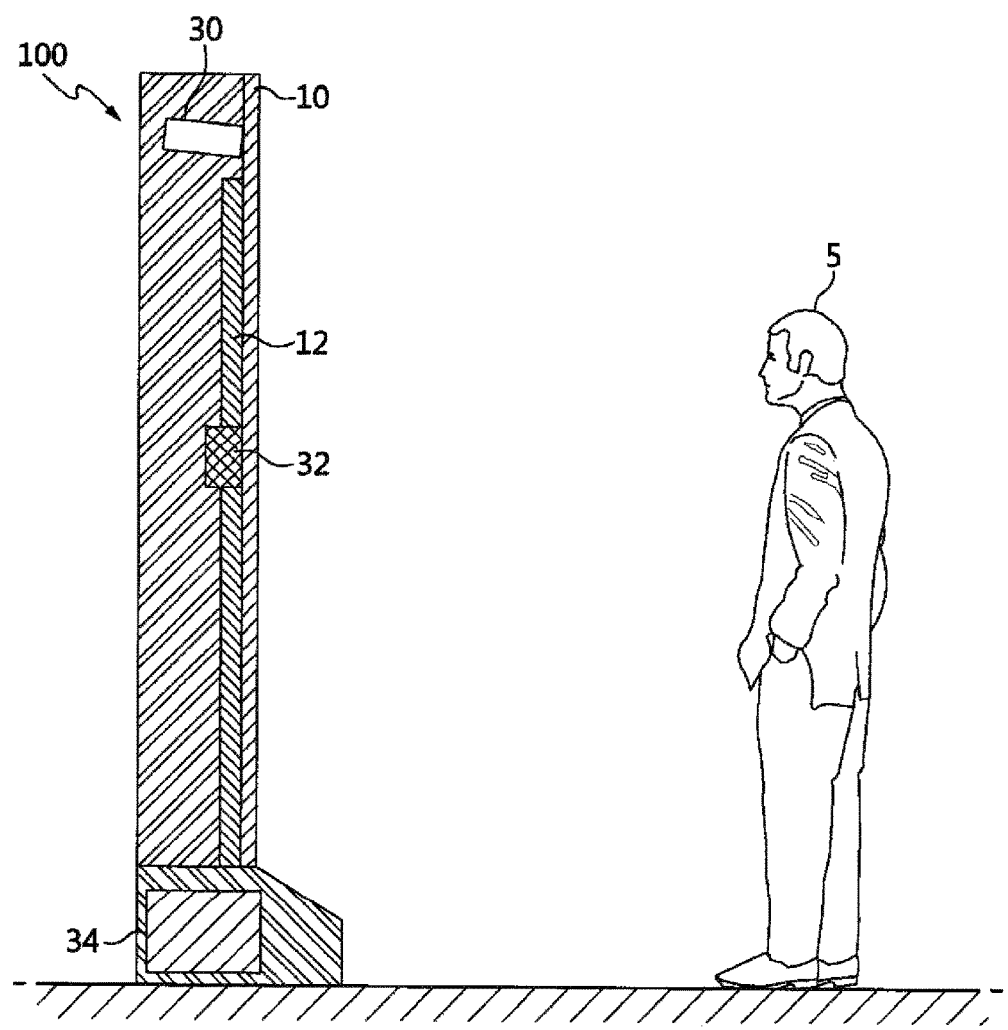
FIG. 11 is a diagram showing the configuration of the hardware system of FIG. 10.
Figure 12:
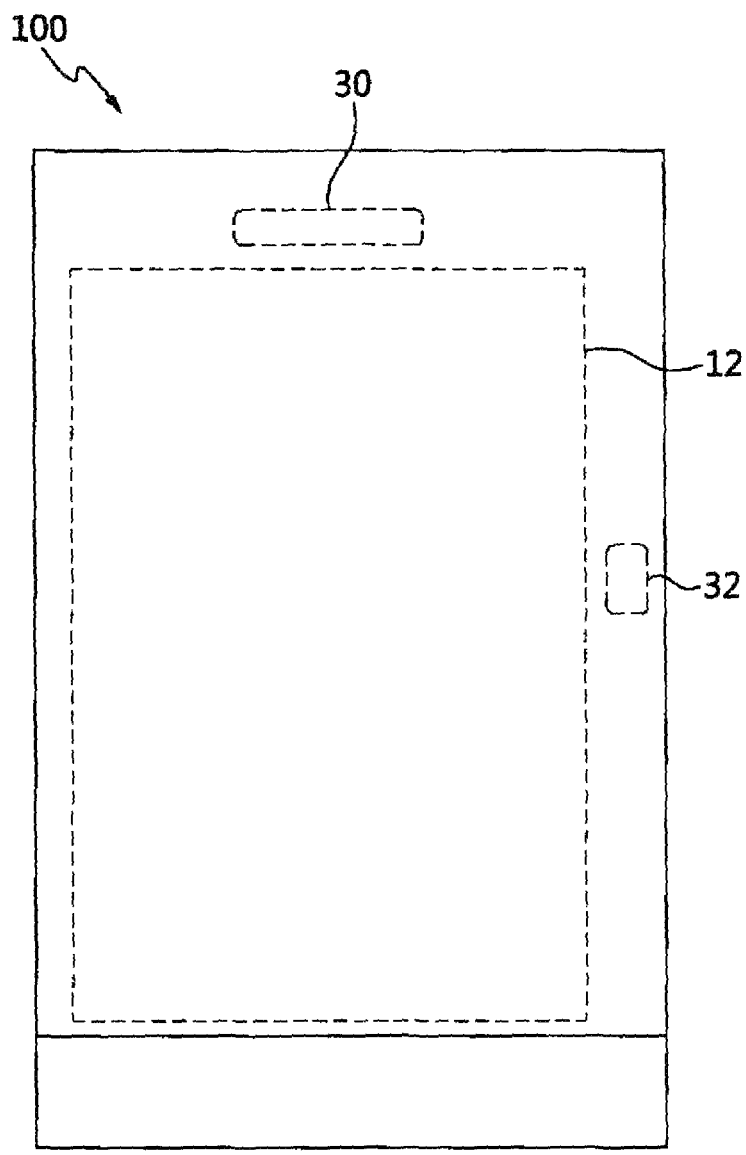
FIG. 12 is a rear view of FIG. 11.
Figure 13:
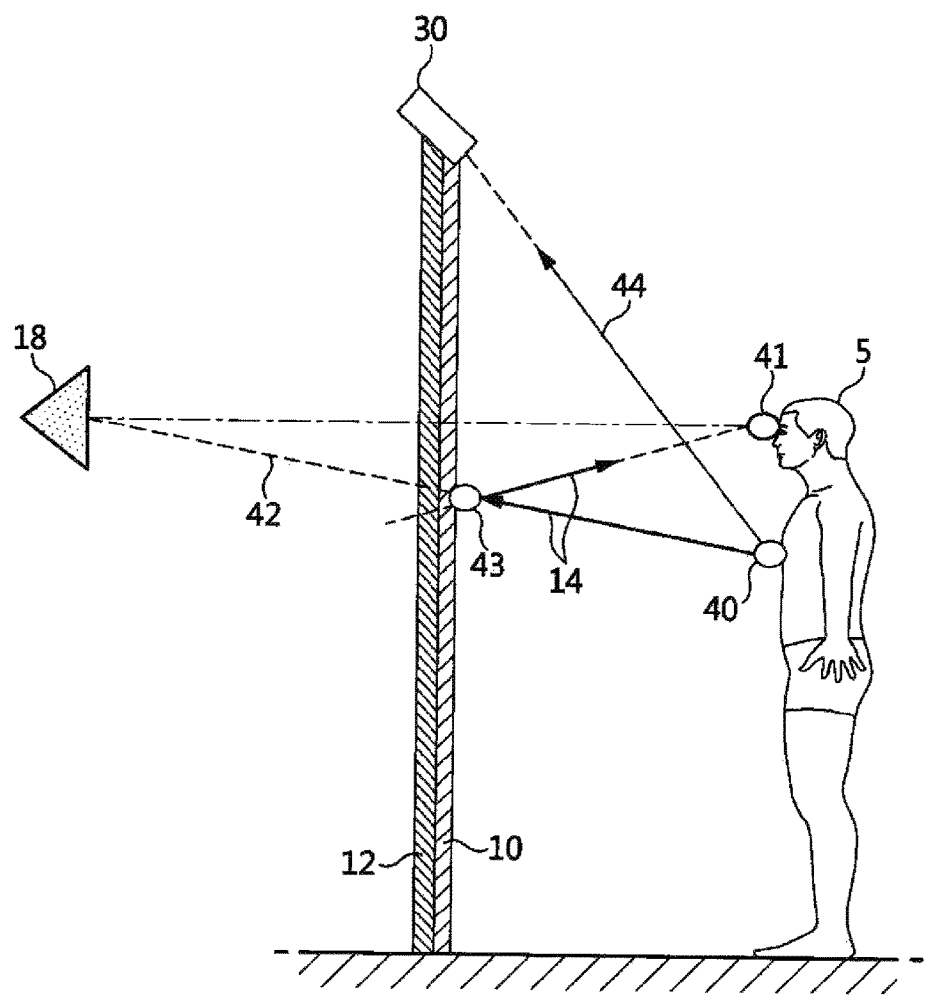
FIG. 13 is a diagram illustrating the optical characteristics of an apparatus for providing augmented reality-based realistic experience according to an embodiment of the present invention.

FIG. 10 is a diagram showing the configuration of an apparatus for providing augmented reality-based realistic experience according to an embodiment of the present invention, FIG. 11 is a diagram showing the configuration of the hardware system of FIG. 10, FIG. 12 is a rear view of FIG. 11, and FIG. 13 is a diagram illustrating the optical characteristics of an apparatus for providing augmented reality-based realistic experience according to an embodiment of the present invention.

The apparatus for providing augmented reality-based realistic experience according to the present embodiment of the present invention includes a hardware system 100 and a software processing unit 200. In this case, the hardware system 100 may be also referred to as a "hardware unit."

The hardware system 100 includes: a mirror 10 configured to include two optical characteristics (the reflective characteristic 14 of an actual mirror, and a external light-transmissive characteristic 16); a display panel 12 configured to display an image of an augmented reality entity; an image sensor 30 configured to acquire the information (for example, location, motion, three dimensional (3D) shape information) of a user; a video sensor 32 configured to acquire a natural video image of the user; and a computation device 34 configured to perform the processing of operations.

The software processing unit 200 displays an augmented reality entity on the display panel 12 through image processing or 3D rendering in accordance with the location, motion and shape information of the user based on the hardware system 100.

The software processing unit 200 includes a user information acquisition and processing unit 210, a user video image acquisition and processing unit 220, and an augmented reality entity processing and visualization unit 230.

The user information acquisition and processing unit 210 receives the user information (for example, location, motion and 3D shape information) via the image sensor 30 of the hardware system 100.

The user video image acquisition and processing unit 220 acquires and processes a video image of the user at a location similar to that of the appearance of the user that is reflected on an actual mirror. Since the video sensor 32 may be installed at a location most similar to that of the appearance of the user that is reflected on an actual mirror, the user video image acquisition and processing unit 220 may receive the video image of the user from the video sensor 32.

The augmented reality entity processing and visualization unit 230 may process and visualize the augmented reality entity based on the user information from the user information acquisition and processing unit 210 and the user video image from the user video image acquisition and processing unit 220. In this case, the user video image from the user video image acquisition and processing unit 220 is optional. The augmented reality entity processing and visualization unit 230 may basically process and visualize the augmented reality entity using only the user information from the user information acquisition and processing unit 210. The user video image from the user video image acquisition and processing unit 220 may be used as desired.

The software processing unit 200 is implemented via the computation device 34.

In the hardware system 100, the display panel 12, the image sensor 30, and the video sensor 32 are prevented from being directly exposed to the user 5 by the mirror 10. The individual sensors 30 and 32 acquire the location, motion, shape and video image information of the user via light reflected on the mirror 10.

The display panel 12 may be implemented as a general display panel when a system is constructed for a single experiencing user, or may be implemented as a multi-view display panel when a system is constructed for multiple users, depending on the purpose of a service.

The video sensor 32 may be implemented as one of various image sensors, such as a web cam, a video cam, and a DSLR camera, which are capable of acquiring a real-time video image based on the motion of the user. It is preferred that the video sensor 32 is located at a location most similar to that of the appearance of the user that is reflected on an actual mirror.

The image sensor 30 has no special limitation in terms of a location in the system, unlike the video sensor 32. It is sufficient if the image sensor 30 can view the body part of the user reflected on an actual mirror. The image sensor 30 may be implemented as an RGBD sensor for providing a color image and a depth image together, such as a Kinect sensor, or an RGB sensor for providing only a color image, like the video sensor 32. This image sensor 30 may be also referred to as a "user information acquisition sensor."

In the detailed description of the present specification, the image sensor 30 is described chiefly based on a sensor for providing a color image, a depth image and skeletal joint information regarding the motion of the user, such as a Kinect sensor. Furthermore, although the present invention is not targeted at only a user, embodiments will be described based on user-centric realistic experience service.

The appearance of the user reflected on the mirror 10 is generated without delay regardless of the software processing unit 200. An augmented reality entity viewed to the user 5 via the software processing unit 200 is displayed via the display panel 12 after a delay corresponding to the time obtained by adding the delay component of the sensor and the delay component of the software processing unit 200, the embodiment of the present invention is described on the assumption that the user is situated in a static state without such delay components.

When the user 5 is located in front of the hardware system 100, the user 5 will view his or her appearance reflected on the mirror via the first optical characteristic of the mirror 10 of the hardware system 100, like his or her appearance reflected on a general mirror.

Prior to the following description of embodiments of the present invention, it is assumed that the image sensor 30, the video sensor 32, the display panel 12, and the mirror 10 installed in the hardware system 100 know a local coordinate system that represents the relative locations and directions of the system components 30, 32, 12 and 10 with respect to a single 3D global coordinate system. This process is referred to as "system calibration" below. That is, when the location of a point in 3D space is known, a 2D location projected onto the image surface of each sensor and the surfaces of the mirror and the display panel may be calculated. In the following embodiments, the mirror 10 and the display panel 12 are modeled to have ideal optical characteristics, like the image surface of the image sensor 30 and descriptions thereof are given.

Figure 9:
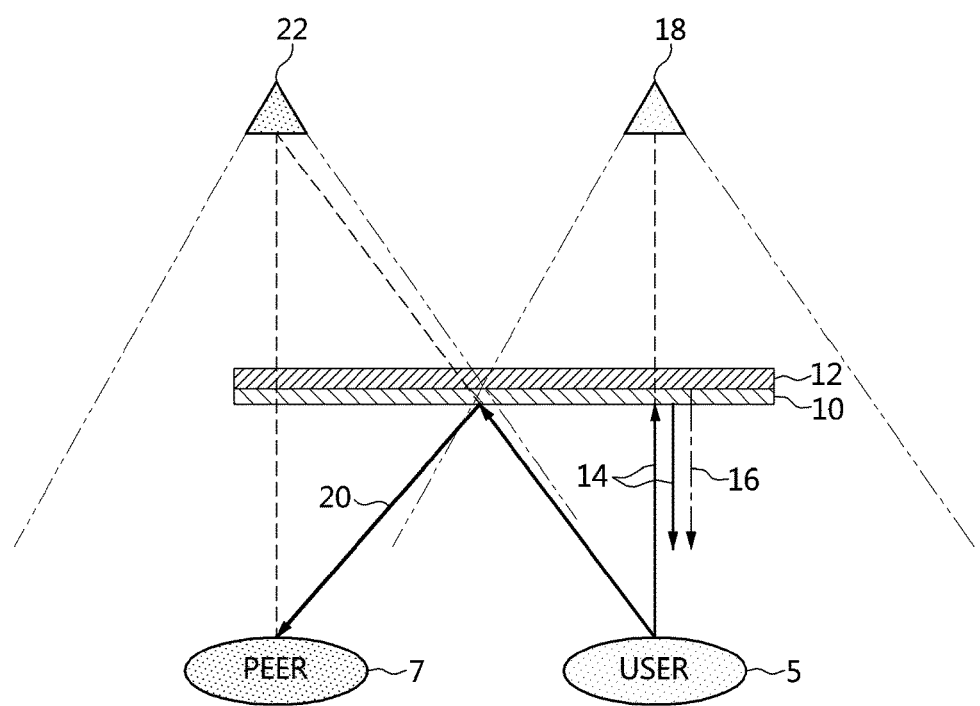
FIG. 9 is a diagram showing relationships in conventional multiple user viewpoint-based mirror-based augmented reality visualization.

As an example, when the 3D location 41 of the eyes of the user (the experiencing user) 5 of FIGS. 9 and 13 is known, a virtual camera viewpoint that describes optical projection from the point of view of a mirror may become 18 in FIG. 13. This characteristic is described in Korean Patent Application Publication No. 2013-0128202. Since this is the basic optical characteristic of a mirror, an additional description thereof is omitted.

Additionally, Korean Patent Application Publication No. 2013-0128202 processes the locations of the eyes of a user as a single 3D point. The eyes of an actual human correspond to a binocular system (including the left eye and the right eye). One of both eyes acts to form a convergence angle. That is, if the location of an object viewed with both eyes is viewed to be closer when the object is viewed with one of both eyes, the one eye acts to form a convergence angle. Since the present invention calculates the 3D locations of both eyes, a more accurate augmented reality system may be constructed by determining the convergence angle of the user via simple UI development. The determination of a convergence angle via UI development is enabled by causing a user to view an object on the screen of a mirror screen in the state in which both eyes are open, the user to close both eyes, and then the user to determinate and select which is closer to the location of the object on the screen, which was viewed in the state in which both eyes were open. Through this process, the case of using the location of a convergence angle may implement more accurate augmented reality in a mirror-based augmented reality system than the case of implementing augmented reality with the center location of both eyes set to the location of the eyes of a human.

Additionally, since an actual binocular system views an object through the combination of the left eye and the right eye, an augmented reality corresponding to a convergence angle is implemented, and a user is allowed to adjust the location of the eyes for augmented reality via a GUI within the range of a distance (about 6 cm on an adult basis) between the left and right eyes, thereby implementing more comfortable and accurate augmented reality.

Assuming that a single point 40 on the body part of the user 5 is known, the user can view the point 40 via the path of light 14 due to the first optical characteristic of the mirror 10. It may be found via the relative coordinate systems of the components of the system that a location projected onto the mirror 10 is a point 43 at which a 3D rectilinear line 42, connecting a point 40 and a virtual camera viewpoint 18 equivalent to the location of the eyes of the user 5, and the mirror 10 intersect each other.

Furthermore, this may be used to calculate the location of a pixel in a 2D image coordinate system where the point 40 is projected onto the color image and depth image of the image sensor 30 by the light 44. That is, when the image sensor 30 provides a depth image, the 3D location of the point 40 may be calculated, and also the location of the point 43 may be calculated via the 3D location of the point 40. When an augmented reality presentation system using a common mirror presents a color value, to be presented at the location of the point 40, at the pixel location of the point 43 in a 2D image coordinate system via the display panel 12, the user 5 experiences augmented reality.

Figure 7:
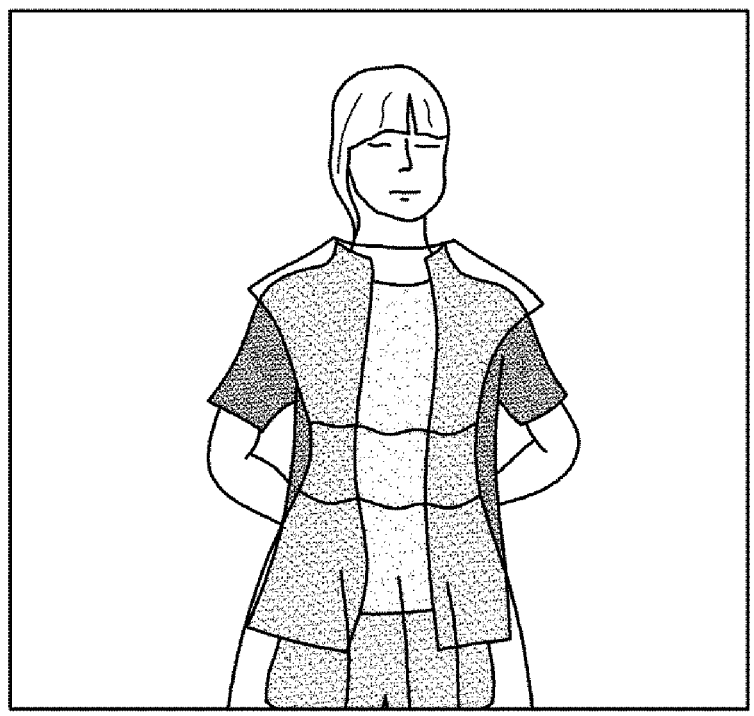
Figure 8:
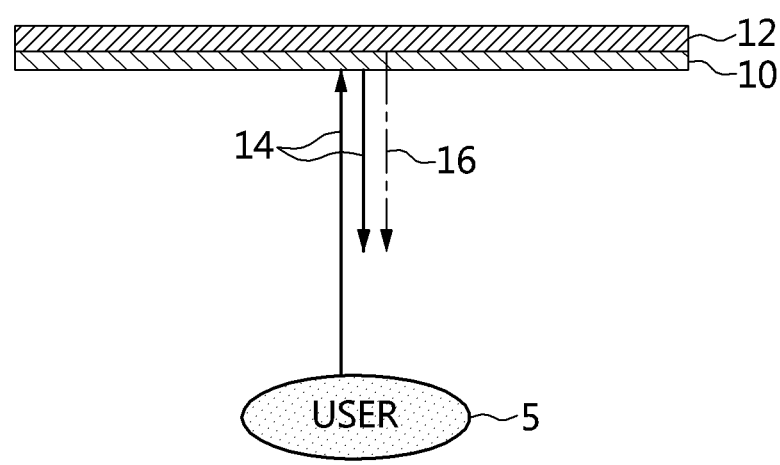
FIG. 8 is a diagram showing an example of a conventional mirror-based system for augmented reality realistic experience service.

Although a method of presenting augmented reality in an ideal situation is described in the above-described Korean Patent Application Publication No 2013-0128202, the method has a limitation in that the user 5 does not receive the presentation of augmented reality entity that is expected by a content creator, as shown in FIG. 7, due to the characteristic of an actual mirror 10, such as that shown in FIG. 8.

In order to overcome this color presentation problem, an embodiment of the present invention proposes color compensation, which is described with reference to FIGS. 14 to 17.

Figure 14:
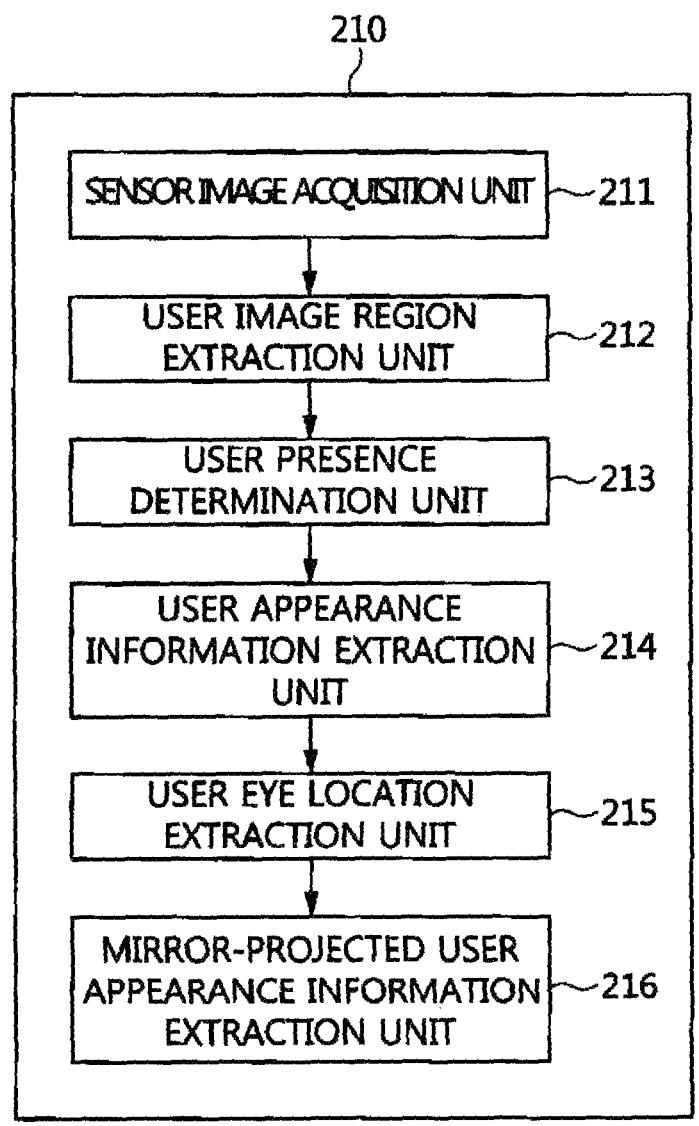
FIG. 14 is a diagram showing the internal configuration of the user information acquisition and processing unit shown in FIG. 10.
Figure 15:
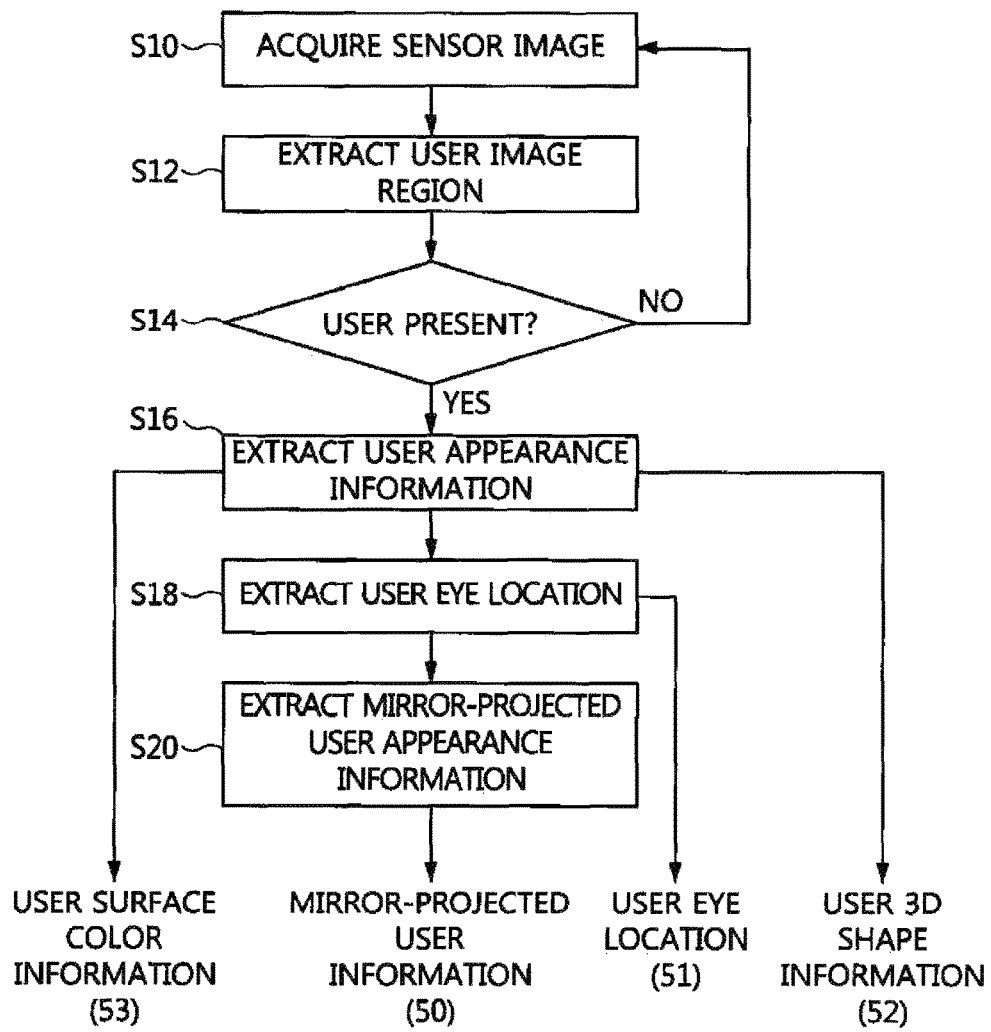
FIG. 15 is a diagram illustrating the operation of the user information acquisition and processing unit shown in FIG. 10.

FIG. 14 is a diagram showing the internal configuration of the user information acquisition and processing unit 210 shown in FIG. 10, and FIG. 15 is a diagram illustrating the operation of the user information acquisition and processing unit 210 shown in FIG. 10.

The user information acquisition and processing unit 210 of the software processing unit 200 includes a sensor image acquisition unit 211, a user image region extraction unit 212, a user presence determination unit 213, a user appearance information extraction unit 214, a user eye location extraction unit 215, and a mirror-projected user appearance information extraction unit 216.

The sensor image acquisition unit 211 may receive the color image and depth image of the user and, in the case where the user is present, user joint information from the image sensor 30 and the video sensor 32.

The user image region extraction unit 212 may extract a user projected region within an image from the sensor image acquisition unit 211 in order to determine whether the user is present. That is, the user image region extraction unit 212 may extract a user projected region within an image based on the color image, the depth image and the user joint information.

The user presence determination unit 213 determines whether the user is present in the image from the user image region extraction unit 212.

The user appearance information extraction unit 214 extracts the appearance information (for example, 3D shape information 52 indicative of the height and physical appearance shape characteristics of the user, and surface color information 53 indicative of the appearance surface color characteristics of the user) of the user using the color of the image region of the user and 3D shape information.

The user eye location extraction unit 215 extracts the 3D location 51 of the eyes of the user 5 through the analysis of the anthropometrical body rate information of the user appearance information from the user appearance information extraction unit 214 and the color characteristics of the eyes of the face region within a color image in order to find the virtual camera viewpoint 18 equivalent to the location of the eyes of the user.

As the location of the eyes of the user is extracted by the user eye location extraction unit 215, the mirror-projected user appearance information extraction unit 216 extracts user information (for example, 3D shape information and surface color information) (referred to as mirror-projected user information 50), projected onto the surface of the mirror 10, based on the appearance information of the user extracted by the user appearance information extraction unit 214 using system calibration information.

Next, the operation of the user information acquisition and processing unit 210 configured as described above is described. When the user 5 approaches within a predetermined region, the user information acquisition and processing unit 210 determines whether the user is present within a region in which realistic experience is possible by analyzing a sensor image in which an image of the user 5 has been photographed at steps S10, S12 and S14. For this purpose, the sensor image acquisition unit 211 receives a color image and a depth image, and, if the user is present, user joint information from the sensor. Furthermore, the user image region extraction unit 212 extracts a user projected region from the image in order to determine whether the user is present. When the image sensor 30 provides the user joint information, the user image region extraction unit 212 extracts image regions corresponding to a corresponding joint location from the depth image and the color image by projecting the joint information onto the depth image and the color image. The user presence determination unit 213 performs subsequent step S16 if the depth and color information of the extracted image regions has the anthropometrical characteristics of the human body, and returns to step S10 if not. In this case, when the image sensor 30 provides the joint information of the user, the user presence determination unit 213 may determine whether the user is present by preferentially performing comparison with the anthropometrical characteristics of the input joint information.

If the user is present ("Yes" at step S14), the user appearance information extraction unit 214 of the user information acquisition and processing unit 210 extracts the appearance shape characteristics and appearance surface color characteristics of the height and body of the user using the color and 3D shape information of the image region of the user at step S16. That is, the user appearance information extraction unit 214 may extract information about the face region, torso region, etc. of the user. When the image sensor 30 provides joint information, the information may be more rapidly extracted based on the joint information. For a more detailed description, see Korean Patent Application Publication No. 2014-0077820 and Korean Patent Application Publication No. 2014-0052792.

Thereafter, in order to find the virtual camera viewpoint 18 equivalent to the location of the eyes of the user, the user eye location extraction unit 215 extracts the 3D location 51 of the eyes of the user 5 via the analysis of anthropometrical body rate information from the user appearance information extracted by the user appearance information extraction unit 214 and the color characteristics of the eyes of the face region within the color image at step S18.

Once the location of the eyes of the user has been extracted, the mirror-projected user appearance information extraction unit 216 may calculate the point 43 projected onto one surface of the mirror 10 using the 3D shape information 52 of the user extracted by the user appearance information extraction unit 214 based on system calibration information. In order to more easily implement this, the 3D location 40 of a corresponding pixel is calculated using the depth information of the depth image for all the pixels of the user image region extracted by the user image region extraction unit 212, this is converted into a 3D mesh structure using inter-pixel adjacent information, and projection is performed with the point of a 3D vertex constituting the mesh structure considered to be a point 40, thereby extracting the user information 50 (3D shape information and surface color information) projected on the surface of the mirror 10. For a more detailed description of the implementation of the mirror-projected user appearance information extraction unit 216, see Korean Patent Application Publication No. 2014-0052792.

Figure 16:
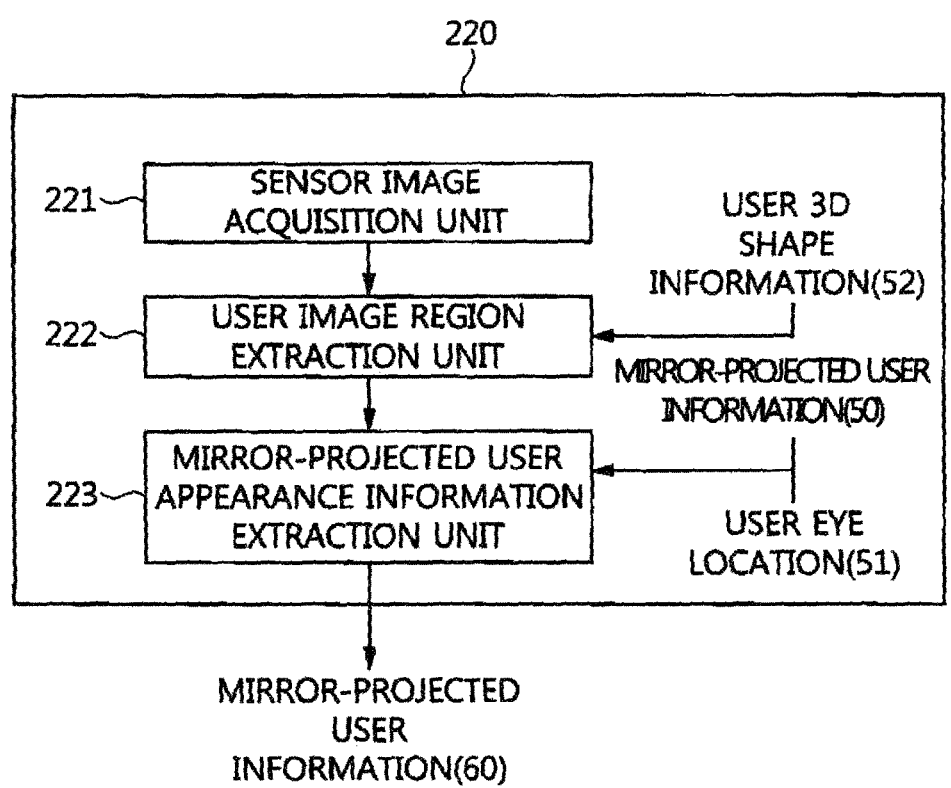
FIG. 16 is a diagram showing the internal configuration of the user video image acquisition and processing unit shown in FIG. 10.

FIG. 16 is a diagram showing the internal configuration of the user video image acquisition and processing unit 220 shown in FIG. 10.

The user video image acquisition and processing unit 220 includes a sensor image acquisition unit 221, a user image region extraction unit 222, and a mirror-projected user appearance information extraction unit 223.

The sensor image acquisition unit 221 acquires an image of the user at the sensor location of the video sensor 32.

The user image region extraction unit 222 may extract the image region of the user, acquired by the video sensor 32, by projecting the 3D shape information 52 of the user from the user information acquisition and processing unit 210 onto the video sensor 32 using the system calibration information.

The mirror-projected user appearance information extraction unit 223 may calculate the surface color information, projected onto the surface of the mirror 10, for each location of the surface of the mirror 10 with respect to the surface color information corresponding to the image region of the user from the user image region extraction unit 222 according to a method, such as that of FIG. 13 using the mirror-projected user information 50 and the user eye location information 51 from the user information acquisition and processing unit 210. Accordingly, the mirror-projected user appearance information extraction unit 223 may calculate user information 60, including an increased amount of information, which is projected onto the mirror 10.

Next, the operation of the user video image acquisition and processing unit 220 described as described above is described. The user video image acquisition and processing unit 220 may be selectively operated in order to improve the quality of color compensation. That is augmented reality entity processing and visualization may be directly performed using the mirror-projected user information 50 acquired via the user information acquisition and processing unit 210 without intervention of the user video image acquisition and processing unit 220. Meanwhile, additionally using the process of the user video image acquisition and processing unit 220, the user may have realistic experience through more realistic color compensation via the additional extraction of user surface color corresponding to the square region of the image sensor 30 in the case of using the mirror-projected user information 60 in which the quality of the mirror-projected user information 50 has been improved.

The user video image acquisition and processing unit 220 acquires an image of the user corresponding to the case where the user is present, i.e., the result of the determination performed by the user presence determination unit 213, at the location of the video sensor 32 via the sensor image acquisition unit 221. As described above, the location of the video sensor 32 may provide information, most similar to the appearance of the user that the user 5 can view via the actual mirror 10, to the software processing unit 200.

Thereafter, the user image region extraction unit 222 extracts the image region of the user, acquired by the video sensor 32, by projecting the 3D shape information 52 of the user, from the user information acquisition and processing unit 210, onto the video sensor 32 using the system calibration information.

Furthermore, the mirror-projected user appearance information extraction unit 223 calculates surface color information projected onto the surface of the mirror 10 for each location of the surface of the mirror 10 with respect to surface color information corresponding to the image region (i.e., the image region extracted by the user image region extraction unit 222) of the user from the image sensor 30 according to a method, such as that of FIG. 13, using mirror-projected user information 50 and user eye location information 51 acquired by the user information acquisition and processing unit 210. Through this process, the mirror-projected user appearance information extraction unit 223 calculates user information (i.e., mirror-projected user information 60), including an increased amount of information, which is projected onto the mirror 10.

In this case, the mirror-projected user information 60 may include the color of the square region not acquired by the above-described image sensor 30 and information about the unique surface color of the user compared to an surrounding lighting environment acquired via the analysis of images acquired at the different locations of the two sensors 30 and 32. In this case, the former case (the color of the square region not acquired by the above-described image sensor 30) may be easily understood and implemented based on knowledge in the related technical field. The latter case (the information about the unique surface color of the user compared to an surrounding lighting environment acquired via the analysis of images acquired at the different locations of the two sensors 30 and 32) may calculate how the surface color information of the 3D location 41 of the eyes of the user 5 is represented at the point 43 using differential information between the normal information of an object surface and normal information about the fact that the two sensors 30 and 32 view the user. The latter case may use linear interpolation or a surface reflection characteristic model, such as a Lambertian reflection model, based on the color value of a corresponding pixel of the two images. This may be easily implemented using the basic knowledge of computer vision.

As described above, the surface color information of the user projected onto the mirror 10 may be calculated via the user information acquisition and processing unit 210 and the user video image acquisition and processing unit 220. That is, the color value of light input to the eyes of the user 5 may be calculated via the light 14 based on the first optical characteristic of the mirror 10 of FIG. 8.

In the case where only the location of the point 43 projected onto the mirror 10 is simply calculated and an augmented reality entity is presented at the equivalent location of the display panel 12, like the light 16, as in conventional mirror-based augmented reality technology, an image, such as that of FIG. 7, is input to the eyes of the user, thereby making realistic experience difficult.

This color representation problem may be overcome by presenting an augmented reality entity with the mirror-projected user information 50 in the user information acquisition and processing unit 210 or the mirror-projected user information 60 in the user video image acquisition and processing unit 220 incorporated thereto, rather than representing the augmented reality entity in such a way as to simply render the augmented reality entity at the point 43 via the augmented reality entity processing and visualization unit 230.

Figure 17:
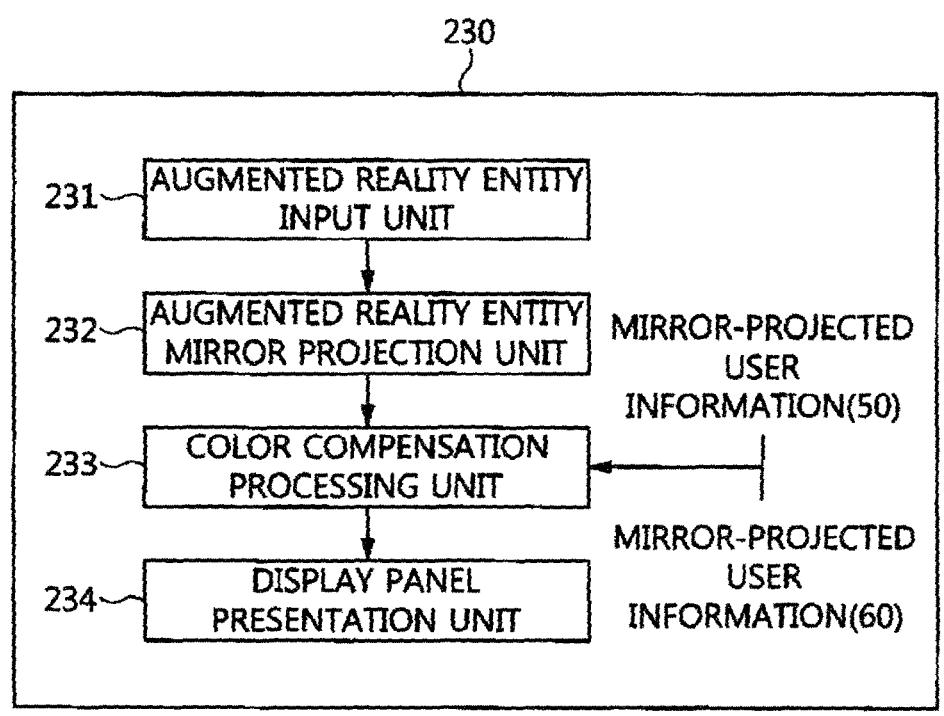
FIG. 17 is a diagram showing the internal configuration of the augmented reality entity processing and visualization unit shown in FIG. 10.

FIG. 17 is a diagram showing the internal configuration of the augmented reality entity processing and visualization unit shown in FIG. 10.

The augmented reality entity processing and visualization unit 230 includes an augmented reality entity input unit 231, an augmented reality entity mirror projection unit 232, a color compensation processing unit 233, and a display panel presentation unit 234.

The augmented reality entity input unit 231 receives an augmented reality entity to be presented from the hardware system 100.

When the augmented reality entity composed of 3D data is input, the augmented reality entity mirror projection unit 232 may easily calculate a location on the display panel 12 corresponding to the point 43 on the mirror 10 using the optical characteristics of the point 40 and point 43 of FIG. 13, and may calculate the color value of the light 16 based on the second optical characteristic of the mirror 10 at the calculated location of the display panel 12.

The color compensation processing unit 233 enables the user to view a color corresponding to the light 16 based on the optical characteristics (for example, the transmittances of the front and rear surfaces of the mirror with respect to light) of the mirror 10 using a color value corresponding to the light 16 input from the augmented reality entity mirror projection unit 232 and a color value corresponding to the light 14 via the user information acquisition and processing unit 210 or user video image acquisition and processing unit 220. That is, the color compensation processing unit 233 compensates for the color value input from the augmented reality entity mirror projection unit 232 using the color value of the mirror-projected user information 50/mirror-projected user information 60 according to various color compensation or color correction methods. In other words, the color compensation processing unit 233 compensates for the color value of the light 16 based on the second optical characteristic of the mirror 10, input from the augmented reality entity mirror projection unit 232, using the color value of the mirror-projected user information 50/mirror-projected user information 60, thereby outputting a color value modified from the color value from the augmented reality entity mirror projection unit 232.

The display panel presentation unit 234 presents an augmented reality entity using the modified color value output from the color compensation processing unit 233.

Next, the operation of the augmented reality entity processing and visualization unit 230 configured as described above is described.

First, the augmented reality entity processing and visualization unit 230 receives an augmented reality entity from the hardware system 10 via the augmented reality entity input unit 231. Although an entity is chiefly composed of 3D data in common embodiments, the entity is not limited to 3D data in the present invention. In connection with the application of the optical characteristic of FIG. 13, even when an entity is input in the form of a 2D image, there is no difference in implementation.

In a higher level embodiment, when an augmented reality entity composed of 3D data is input, the augmented reality entity mirror projection unit 232 may easily calculate a location on the display panel 12 corresponding to the location point 43 on the mirror 10 using the optical characteristics of the point 40 and point 43 of FIG. 13. In the case of a service, such as virtual clothes fitting, targeted at a common user, an augmented reality entity is represented in a 3D space in digital space corresponding to the 3D location of a user. This means that the system knows the 3D location of the augmented reality entity corresponding to the location of the point 40 and the color value of the corresponding location. A more detailed implementation of this can be found from Korean Patent Application Publication No. 2014-0077820.

The color value of light corresponding to the light 16 of FIG. 8 may be calculated via the augmented reality entity mirror projection unit 232. That is, the software processing unit 200 enables the user to become aware of a color value based on the mirror effect of the user attributable to the first and second optical characteristics of the mirror 10 and a color value to be represented by the display panel 12 for augmented reality at all locations projected onto the mirror.

Accordingly, the color compensation processing unit 233 enables the user to view a color corresponding to the light 16 based on the optical characteristics (for example, the transmittances of the front and rear surfaces of the mirror with respect to light) of the mirror 10 using a color value corresponding to the light 16 input from the augmented reality entity mirror projection unit 232. That is, the color compensation processing unit 233 may compensate for the color value input from the augmented reality entity mirror projection unit 232 using the color value of the mirror-projected user information 50/mirror-projected user information 60 according to various color compensation or color correction methods. In other words, the color compensation processing unit 233 may compensate for the color value of the mirror-projected user information 50 or 60 with respect to a color value corresponding to the light 16, based on the second optical characteristic of the mirror 10, from the augmented reality entity mirror projection unit 232. Accordingly, the color compensation processing unit 233 may output a color value modified from the input color value of the augmented reality entity mirror projection unit 232. The color compensation of the color compensation processing unit 233 is performed using the mixing characteristic of light. That is, the color compensation uses the characteristic in which a white color is generated by adding all types of light. The color compensation for an individual color channel may be performed in the RGB color space, the CIELab color space, or the like.

The color compensation uses the reflectivity w1 of the first optical characteristic and the transmittance w2 of the second optical characteristic possessed by the mirror 10, and uses a color rgb1 attributable to the light 14 and a color rgb2 attributable to the light 16. W1/w2 refers to the previously described %/100, and has a value of [0, 1]. rgb1/rgb2 refers to the value of a color channel, and, for example, has a value of [0, 255] for each channel in the RGB color space. In the case of rgb1, each color channel is represented as (red, green, blue)=(r1, g1, b1). That is, when the reflectivity of w1 is 80%, w1=0.8.

As an example, in the case where rgb2=(100, 50, 60) and rgb1=(20, 30, 40), w1=0.8 and w2=0.4, when the color of an augmented reality entity desired by a content creator is rgb, the value of an r channel is obtained by calculating a color value to be presented to the display panel 12 using the equation $r1*w1+r2*w2=r$.

In this color compensation, when the color is saturated, it is impossible to calculate rgb2 for the desired rgb. In this case, the color compensation processing unit 233 may calculate rgb2 closest to rgb using the above-described computation in a cognitive-scientific color space, such as the CIELab color space. In the case of the CIELab color space, the distances between channels were designed based on cognitive-scientific characteristics, and thus a color close to rgb in a cognitive-scientific aspect, rather than in a color space, such as the RGB color space, may be transferred to the user.

The mitigation of a color saturation phenomenon may mitigate a color saturation threshold value by adjusting the relative values of the brightness of external light and the brightness of light attributable to the candela value of the display panel. That is, when the brightness of the panel is higher than external brightness, a color saturation phenomenon can be reduced. The above equation is based on the assumption that two pieces of brightness are the same. In a relative case (for example, external brightness is l1, and the panel brightness is l2), when relative numerical values are incorporated into w1/w2 (w'1=w1*l1, and w'2=w2*l2), easy implementation can be achieved. In the case of L2>l1, the color saturation phenomenon may be mitigated.

The color value rgb2 modified using the above method is presented via the display panel presentation unit 234, and thus the color rgb desired by a content creator may be transferred to the user.

A problem regarding the representation of the color of an augmented reality entity that a conventional augmented reality-based realistic experience system using a mirror has is solved via the software processing unit 200, and thus a color that a realistic experience content creator desires to transfer can be accurately transferred to a user even when a mirror-based method is used.

The color compensation method using the software processing unit 200 may be applied to an augmented reality system in which only a transparent display panel is employed without a mirror or a transparent display-based augmented reality system, such as Google Glass, in the same manner. That is, equivalent implementation may be achieved in such a way that the transmittance of light entering from a location behind the display panel 12, such as the light 14, other than the reflectivity of light reflected on the mirror 10, is substituted for w1 and a color entering from a location behind the display panel 12 is substituted for rgb1.

A method for solving the problem in which it is difficult to share realistic experience between multiple users when an augmented reality-based realistic experience service using a mirror is constructed, unlike in a virtual mirror-based method, is described using an embodiment below.

Figure 18:
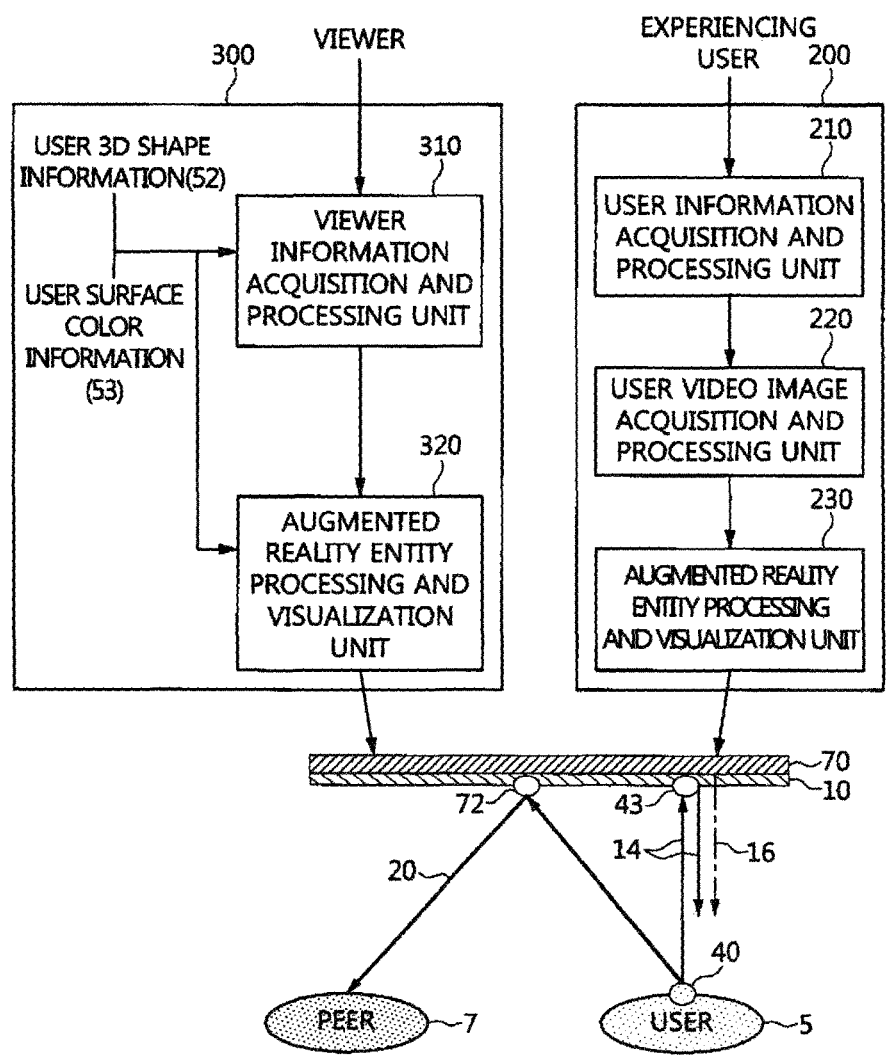
FIG. 18 is a diagram showing an example of the configuration of a software processing unit for simultaneous multi-user experience.

The multi-user experience problem may be easily solved using the above-described information provided the software processing unit and a display panel configured to provide a multi-view, as shown in FIG. 18. FIG. 18 is a diagram showing an example of the configuration of a software processing unit for simultaneous multi-user experience.

When the above-described optical characteristic of FIG. 13 is expanded and interpreted based on the viewpoint of the viewer (i.e., peer 7) of FIG. 9, the 3D point 40 present on the surface of a user (experiencing user 5) is viewed as being projected onto the location of the point 43 with the eyes of the user, and is viewed as being projected onto the location of a point 72 (see FIG. 18) with the eyes of the peer (viewer 7).

Figure 5:
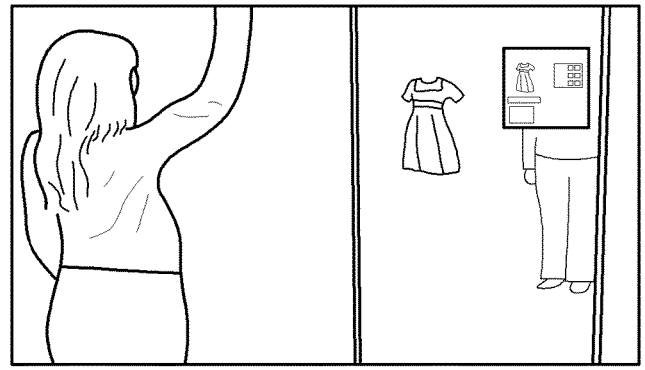
Figure 6:
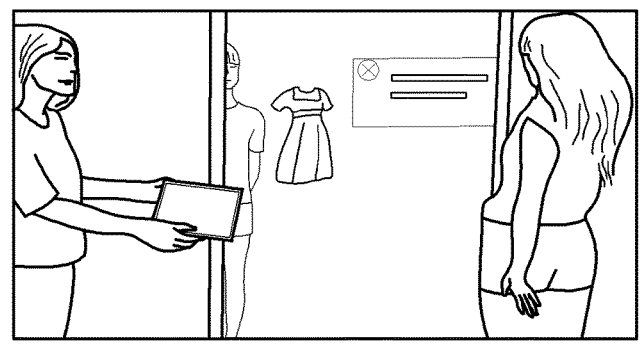

This characteristic may be easily found from FIGS. 5 and 6. That is, the experiencing user (user)-based information of the software processing unit 200 is interpreted based on the viewer, the region of the experiencing user projected onto the mirror and projected surface color information are calculated based on the location of the viewer, and the results of the processing and visualization of an augmented reality entity are presented on a channel of the multi-view display panel 70 close to the viewpoint of the viewer using the calculated information. Accordingly, the viewer may also view the appearance of an entity, presented using an augmented reality technique, on the appearance of the experiencing user reflected on the mirror, as in a virtual mirror-based method.

Accordingly, the software processing unit for simultaneous multi-user experience includes an experiencing user viewpoint-based software processing unit 200, and a viewer viewpoint-based software processing unit 300.

In this case, since the experiencing user viewpoint-based software processing unit 200 is implemented as the same configuration as the above-described software processing unit 200, the same reference numeral is assigned, and a description thereof is omitted.

The viewer viewpoint-based software processing unit 300 may be implemented as a configuration similar to that of the software processing unit 200. The viewer viewpoint-based software processing unit 300 includes a viewer information acquisition and processing unit 310 and an augmented reality entity processing and visualization unit 320.

Figure 19:
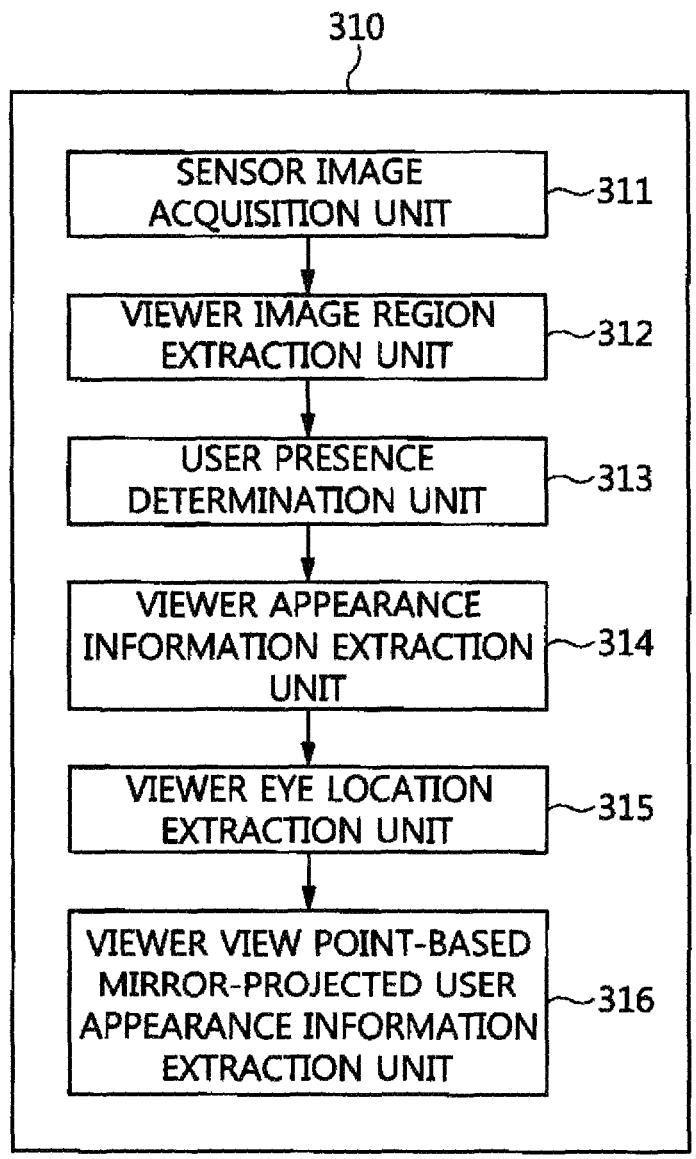
FIG. 19 is a diagram showing the internal configuration of the viewer information acquisition and processing unit shown in FIG. 18.
Figure 20:
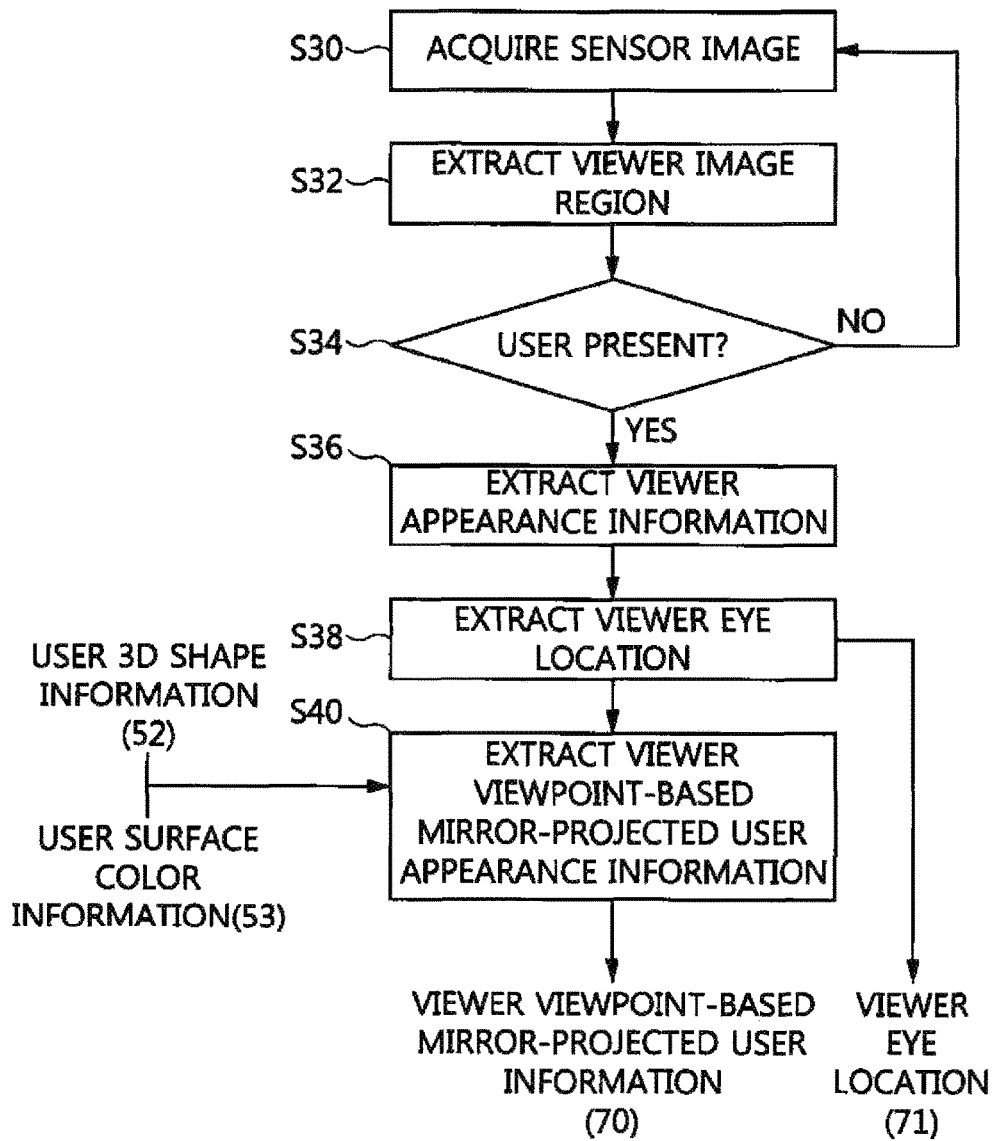
FIG. 20 is a diagram illustrating the operation of the viewer information acquisition and processing unit shown in FIG. 18.

FIG. 19 is a diagram showing the internal configuration of the viewer information acquisition and processing unit shown in FIG. 18, and FIG. 20 is a diagram illustrating the operation of the viewer information acquisition and processing unit shown in FIG. 18.

The viewer information acquisition and processing unit 310 includes a sensor image acquisition unit 311, a viewer image region extraction unit 312, a user presence determination unit 313, a viewer appearance information extraction unit 314, a viewer eye location extraction unit 315, and a viewer view point-based mirror-projected user appearance information extraction unit 316.

The components of the viewer information acquisition and processing unit 310 configured as described above perform almost the same functions as the components of the user information acquisition and processing unit 210. Therefore, the operations S30 to S40 of the viewer information acquisition and processing unit 310 are almost the same as the operations S10 and S20 of the user information acquisition and processing unit 210, and thus redundant descriptions are not given.

The viewer information acquisition and processing unit 310 is different from the user information acquisition and processing unit 210 in connection with the viewer viewpoint-based mirror-projected user appearance information extraction unit 316. That is the sensor image acquisition unit 311, the viewer image region extraction unit 312, the user presence determination unit 313, the viewer appearance information extraction unit 314, and the viewer eye location extraction unit 315 are implemented based on the viewpoint of a viewer in the same manner as the sensor image acquisition unit 211, user image region extraction unit 212, user presence determination unit 213, user appearance information extraction unit 214 and user eye location extraction unit 215 of the user information acquisition and processing unit 210. However, the difference between the point 43 and point 72 of FIG. 18 needs to be implemented via the viewer viewpoint-based mirror-projected user appearance information extraction unit 316.

For this purpose, the viewer viewpoint-based mirror-projected user appearance information extraction unit 316 may calculate the point 72 corresponding to the point 40 using the 3D shape information 52 and surface color information 53 of a user calculated by the user information acquisition and processing unit 210, and may extract the surface color information of the user at the location of the point 72. The basic operation of the viewer viewpoint-based mirror-projected user appearance information extraction unit 316 is the same as that of the mirror-projected user appearance information extraction unit 216, and is different in that an optical projection equation is expanded using the virtual camera viewpoint 22 equivalent to the location of the eyes of the peer 7 rather than the virtual camera viewpoint 18 equivalent to the location of the eyes of the user 5.

Presentation is provided on the display panel 70 based on the viewpoint of a viewer via the augmented reality entity processing and visualization unit 320 using the viewer viewpoint-based surface color information of the user projected onto the surface of the mirror, which is obtained via the viewer information acquisition and processing unit 310, in the same manner as the augmented reality entity processing and visualization unit 230.

Figure 4:
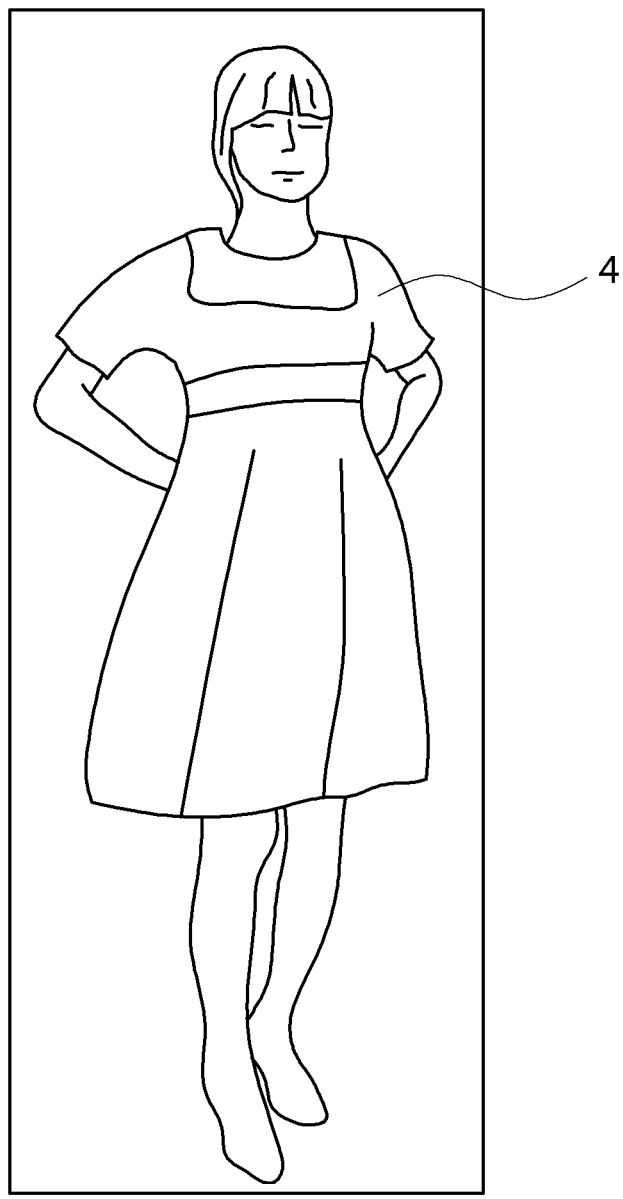

However, the augmented reality entity processing and visualization unit 320 within the viewer viewpoint-based software processing unit 300 is different from the augmented reality entity processing and visualization unit 230 in that an augmented reality entity is presented to one of the multi-view channels of the multi-view display panel 70 at and in a location and a direction identical to the location and direction of the viewer (i.e., peer 7). When the multi-view panel provides an infinite number of viewpoints in terms of theory, the viewer 7 may experience a result, such as that of FIG. 4 provided by a virtual mirror-based method, via the system.

When a panel for providing a limited number of multi-views is used in practice, a method for providing presentation to the most adjacent single channel and a method for performing distributed processing for two adjacent channels may be implemented. In this case, a method in which an image ideally calculated via the viewer viewpoint-based mirror-projected user appearance information extraction unit 316 based on an infinite number of viewpoints is distributed between the two channels using inter-viewpoint image interpolation techniques and the corresponding two channels simultaneously transfer the image to a viewer may be implemented.

In the foregoing description, the methodology for equivalently implementing the advantages of the conventional virtual mirror-based method, i.e., the first advantage of transferring the accurate color of an augmented reality entity, which a content creator desires to transfer, to a user and the second advantage of enabling multiple users to simultaneously have realistic experience, using a mirror-based method has been described using various embodiments.

According to the present invention configured as described above, the problem of reduced reality attributable to the image degradation of a video image sensor, i.e., the disadvantage of the conventional virtual mirror-type augmented reality-based realistic experience system using a video image sensor and a display panel, can be overcome using an actual mirror-based method.

Furthermore, the present invention overcomes the problem in which the accurate color of an augmented reality entity cannot be transferred and the problem in which multiple users cannot have simultaneous experience, i.e., the disadvantages of the conventional mirror-based method, and thus can implement more realistic augmented reality-based realistic experience service, such as virtual clothes fitting or experience, via the combination of hardware, sensors and a software processing unit.

As described above, the exemplary embodiments have been disclosed in the present specification and the accompanying drawings. Although the specific terms have been used herein, they have been used merely for the purpose of describing the present invention, but have not been used to restrict the meanings thereof or limit the scope of the present invention set forth in the attached claims. Accordingly, it will be appreciated by those having ordinary knowledge in the relevant technical field that various modifications and other equivalent embodiments can be made. Therefore, the true range of protection of the present invention should be defined based on the technical spirit of the attached claims.

What is claimed is:

1. An apparatus for providing augmented reality-based realistic experience, comprising:
    a hardware unit including a mirror configured to have a reflective characteristic and a transmissive characteristic, a display panel configured to present an image of an augmented reality entity, and a sensor configured to acquire information about a user; and
    a software processing unit configured to present the augmented reality entity via the display panel based on the information about the user from the hardware unit after performing color compensation on a color of the augmented reality entity,
    wherein presenting the image augmented reality entity via the display panel comprises:
    as the augmented reality entity is received from the hardware unit, calculating a location on the display panel corresponding to an intersection on the mirror using first and second optical characteristics of the mirror;
    calculating a color value of light attributable to the second optical characteristic of the mirror at the calculated location on the display panel;
    compensating for the color value of the light attributable to the second optical characteristic of the mirror; and
    presenting the augmented reality entity based on the compensated color value.

2. The apparatus of claim 1, wherein the software processing unit comprises:
    a user information acquisition and processing unit configured to receive and process the information about the user from the sensor; and
    an augmented reality entity processing and visualization unit configured to process and visualize the augmented reality entity based on the information about the user from the user information acquisition and processing unit.

3. The apparatus of claim 2, wherein the user information acquisition and processing unit comprises:
    a sensor image acquisition unit configured to receive a color image and depth image of the user and user joint information from the sensor;
    a user image region extraction unit configured to extract a user projected region within an image based on the color image, the depth image and the user joint information;
    a user presence determination unit configured to determine whether the user is present in the image from the user image region extraction unit;
    a user appearance information extraction unit configured to extract appearance information of the user from the user projected region within the image if the user is present;
    a user eye location extraction unit configured to extract a location of eyes of the user based on the appearance information of the user; and
    a mirror-projected user appearance information extraction unit configured to extract user information projected onto the mirror based on the appearance information of the user as the location of the eyes of the user is extracted.

4. The apparatus of claim 3, wherein the appearance information of the user extracted by the user appearance information extraction unit comprises three-dimensional (3D) shape information indicative of a height and physical appearance shape characteristic of the user and surface color information indicative of an appearance surface color characteristic of the user.

5. The apparatus of claim 3, wherein the user eye location extraction unit extracts the location of the eyes of the user from the appearance information of the user from the user appearance information extraction unit via analysis of anthropometrical body rate information and a color characteristic of the eyes of a face region.

6. The apparatus of claim 3, wherein the software processing unit further comprises a user video image acquisition and processing unit configured to acquire and process a video image of the user via the sensor.

7. The apparatus of claim 6, wherein:
    the sensor comprises a video sensor; and
    the user video image acquisition and processing unit comprises:
    a sensor image acquisition unit configured to acquire the image of the user from the video sensor;
    a user image region extraction unit configured to projecting the 3D shape information of the user, acquired from the user information acquisition and processing unit, onto the video sensor and extract the image region of the user acquired by the video sensor; and
    a mirror-projected user appearance information extraction unit configured to extract the user information, projected onto the mirror, from the image region of the user, extracted by the user image region extraction unit of the user video image acquisition and processing unit, using mirror-projected user information and user eye location information from the user information acquisition and processing unit.

8. The apparatus of claim 7, wherein the augmented reality entity processing and visualization unit comprises:

an augmented reality entity input unit configured to receive the augmented reality entity, to be presented, from the hardware unit;
an augmented reality entity mirror projection unit configured to, as the augmented reality entity is input, calculate a location on the display panel corresponding to an intersection on the mirror using first and second optical characteristics of the mirror and calculate a color value of light attributable to the second optical characteristic of the mirror at the calculated location on the display panel;
a color compensation processing unit configured to compensate for the color value of the light attributable to the second optical characteristic of the mirror from the augmented reality entity mirror projection unit using the color value of the mirror-projected user information from the user information acquisition and processing unit or the user video image acquisition and processing unit; and
a display panel presentation unit configured to present the augmented reality entity based on the color value compensated for by the color compensation processing unit.

9. The apparatus of claim 8, wherein the augmented reality entity mirror projection unit, when the augmented reality entity composed of 3D data is input, calculates a location on the display panel corresponding to an intersection on the mirror at which a 3D rectilinear line, connecting a point of a body part of the user and a virtual camera viewpoint equivalent to the location of the eyes of the user, and the mirror intersect each other.

10. The apparatus of claim 8, wherein the color compensation processing unit compensates for the color value, calculated by the augmented reality entity mirror projection unit, using a reflectivity of the reflective characteristic of the mirror, a transmittance of the transmissive characteristic of the mirror, a color attributable to the reflective characteristic of the mirror, and a color attributable to the transmissive characteristic of the mirror.

11. The apparatus of claim 1, further comprising a viewer viewpoint-based software processing unit configured to interpret the information from the software processing unit on a viewer basis, calculate a region of the user projected onto the mirror and projected surface color information at a location of a viewer, and perform processing and visualization of the augmented reality entity using the calculated region and information.

12. The apparatus of claim 11, wherein the viewer viewpoint-based software processing unit comprises:
a viewer information acquisition and processing unit configured to output viewer viewpoint-based mirror-projected user information and information about a location of eyes of the viewer based on information about the viewer from the sensor and the 3D shape information and surface color information of the user from the software processing unit; and
an augmented reality entity processing and visualization unit configured to process and visualize the augmented reality entity for a corresponding viewer based on the information from the viewer information acquisition and processing unit and the 3D shape information and surface color information of the user from the software processing unit.

13. The apparatus of claim 12, wherein the viewer information acquisition and processing unit comprises a viewer viewpoint-based mirror-projected user appearance information extraction unit configured to calculate a location of a point on the mirror corresponding to a point on a body part of the user using the 3D shape information and surface color information of the user from the software processing unit, and to extract viewer viewpoint-based mirror-projected user information at the location of the point of the mirror.

14. The apparatus of claim 1, wherein the display panel and the sensor are prevented from being directly exposed to the user by the mirror.

15. An apparatus for providing augmented reality-based realistic experience, comprising:
a hardware unit including a mirror configured to have a reflective characteristic and a transmissive characteristic, a display panel configured to present an image of an augmented reality entity, and a sensor configured to acquire information about a user; and
a software processing unit configured to present the augmented reality entity via the display panel based on the information about the user from the hardware unit after performing color compensation on a color of the augmented reality entity,
wherein presenting the image augmented reality entity via the display panel comprises:
as the augmented reality entity is received from the hardware unit, calculating a location on the display panel corresponding to an intersection on the mirror using first and second optical characteristics of the mirror;
calculating a color value of light attributable to the second optical characteristic of the mirror at the calculated location on the display panel;
compensating for the color value of the light attributable to the second optical characteristic of the mirror; and
presenting the augmented reality entity based on the compensated color value,
wherein the color compensation uses a transmittance of light entering from a location behind the display panel and a color entering from a location behind the display panel.

16. The apparatus of claim 15, further comprising a viewer viewpoint-based software processing unit configured to interpret the information from the software processing unit on a viewer basis, to calculate a region of the user projected onto the mirror and projected surface color information at a location of a viewer, and to perform processing and visualization of the augmented reality entity using the calculated region and information.

17. The apparatus of claim 15, wherein the display panel and the sensor are prevented from being directly exposed to the user by the mirror.

18. A method of providing augmented reality-based realistic experience, comprising:
receiving, by a software processing unit, information about a user from a sensor of a hardware unit including a mirror, a display panel and the sensor; and
presenting, by the software processing unit, an augmented reality entity via the display panel based on the information about the user after performing color compensation on a color of the augmented reality entity,
wherein presenting the augmented reality entity via the display panel comprises:
as the augmented reality entity is received from the hardware unit, calculating a location on the display panel corresponding to an intersection on the mirror using first and second optical characteristics of the mirror;

calculating a color value of light attributable to the second optical characteristic of the mirror at the calculated location on the display panel;

compensating for the color value of the light attributable to the second optical characteristic of the mirror; and presenting the augmented reality entity based on the compensated color value.

19. The method of claim 18, further comprising, by a viewer viewpoint-based software processing unit, interpreting the information from the software processing unit on a viewer basis, calculating a region of the user projected onto the mirror and projected surface color information at a location of a viewer, and performing processing and visualization of the augmented reality entity using the calculated region and information.

20. The method of claim 19, wherein performing the processing and visualization of the augmented reality entity comprises:

outputting viewer viewpoint-based mirror-projected user information and information about a location of eyes of the viewer based on information about the viewer from the sensor and the 3D shape information and surface color information of the user from the software processing unit; and processing and visualizing the augmented reality entity for a corresponding viewer based on the viewer viewpoint-based mirror-projected user information, the information about the location of the eyes of the viewer, and the 3D shape information and surface color information of the user from the software processing unit.

21. The method of claim 18, wherein the display panel and the sensor are prevented from being directly exposed to the user by the mirror.

* * * * *